United States Patent [19]

Bauer

[11] 4,411,464

[45] Oct. 25, 1983

[54] OPERATOR PROTECTIVE POSTS

[75] Inventor: James J. Bauer, Richland, Mich.

[73] Assignee: Clark Equipment Company, Buchanan, Mich.

[21] Appl. No.: 289,627

[22] Filed: Aug. 3, 1981

[51] Int. Cl.[3] .......... B62D 25/06

[52] U.S. Cl. .......... 296/102; 52/656; 52/732; 280/756

[58] Field of Search .......... 296/102; 280/756; 52/731, 732, 656

[56] References Cited

U.S. PATENT DOCUMENTS

| | | | |
|---|---|---|---|
| D. 237,371 | 10/1975 | Brown | D12/61 |
| 2,911,232 | 11/1959 | Hastings | 296/102 |
| 3,017,198 | 1/1962 | Horowitz | 296/102 |
| 3,188,111 | 6/1965 | Ells | 296/102 |
| 3,289,871 | 12/1966 | Tourneau | 296/102 |
| 3,451,713 | 6/1969 | Hollingshead | 296/102 |
| 3,502,368 | 3/1970 | Maxa | 296/102 |
| 3,679,256 | 7/1972 | Orns | 296/102 |
| 3,995,891 | 12/1976 | Hoyt | 296/102 |

OTHER PUBLICATIONS

Clark Drawing No. SI-7114 dated Jan. 22, 1979.

*Primary Examiner*—Bruce H. Stoner, Jr.
*Assistant Examiner*—John A. Carroll
*Attorney, Agent, or Firm*—Mack L. Thomas

[57] ABSTRACT

An industrial vehicle such as a narrow-aisle lift truck has a canopy that extends above the operator's compartment of the vehicle. A pair of elongated vertical posts are mounted to the rear of the canopy at spaced-apart positions. Each of the middle sections of the posts is offset relative to the end portion of the posts. The posts are capable of being mounted to the vehicle so that the distance between the middle sections thereof is either less than the distance between the pairs of respective ends of the posts or greater than the distance.

6 Claims, 5 Drawing Figures

OPERATOR PROTECTIVE POSTS

BACKGROUND OF THE INVENTION

1. Field of the Invention

The field of art to which this invention pertains includes overhead safety guards for industrial vehicles.

2. Description of the Prior Art

It is standard practice to equip industrial lift trucks and other industrial vehicles with overhead guards to protect the operator. The overhead guard commonly includes a canopy extending over the operator's compartment of the industrial vehicle.

Industrial vehicles are often employed in situations where a vehicle of minimum width and maximum maneuverability is desired. One example of this type of industrial vehicle is a narrow-aisle lift truck as shown in U.S. Pat. No. Des. 237,371, assigned to the Assignee of the present invention. Narrow-aisle lift trucks are designed for use in warehouse aisles where aisle width between stacking racks is desirably minimized. The stacking racks often employ horizontal members for supporting pallets. The horizontal members are positioned at various vertical heights. It is common to provide the supporting members at vertical heights which are parallel to the back or head of the operator when he is driving the lift truck. The canopy of the overhead guard of a narrow-aisle lift truck is commonly attached to and supported by the upright of the lift truck.

Narrow-aisle lift trucks manufactured and sold by the Assignee of the present invention optionally include a pair of rear vertical posts extending between the respective rear ends of the canopy and the respective tops of the spaced-apart service compartments which are located at the rear end of the lift truck body. The rear posts are straight elongated beams which are secured at both ends to the lift truck by nut and bolt assemblies. The use of the rear vertical posts hinders operator entrance and egress into the vehicle and obscures operator visibility. Also, the rear vertical posts have to be detached from the tops of respective service compartments before the compartment doors can be opened for servicing the components contained therein. Additionally, if the rear vertical posts are spaced far enough apart to not obscure operator visibility, it is quite possible that the distance between the posts will be greater than the clearance between pallet supporting members making drive-in operations between stacking racks impossible.

However, the use of conventional rear vertical posts on narrow-aisle lift trucks does provide some advantages. Commonly loads are removed from vertical rack openings by backing up while turning abruptly to the side. In this operation the operator is usually sitting or standing at the rear of the truck and is facing forward or to the side of the truck away from the direction of rearward truck travel. Operator error during backing or turning can cause the lift truck to back into pallets or racking on the opposite side of the aisle with possible injury to the truck operator. The provision of the conventional rear vertical posts protects the operator from direct initial contact with the rack or pallets during such a collision.

SUMMARY OF THE INVENTION

This invention solves the previously mentioned problems associated with conventional rear vertical posts while retaining safety advantages discussed above.

Accordingly it is a primary object of this invention to provide rear vertical posts on an industrial vehicle that protect the operator and are designed to not interfere with the working environment of the industrial vehicle.

DETAILED DESCRIPTION OF THE PREFERRED EMBODIMENT

Figure 1:
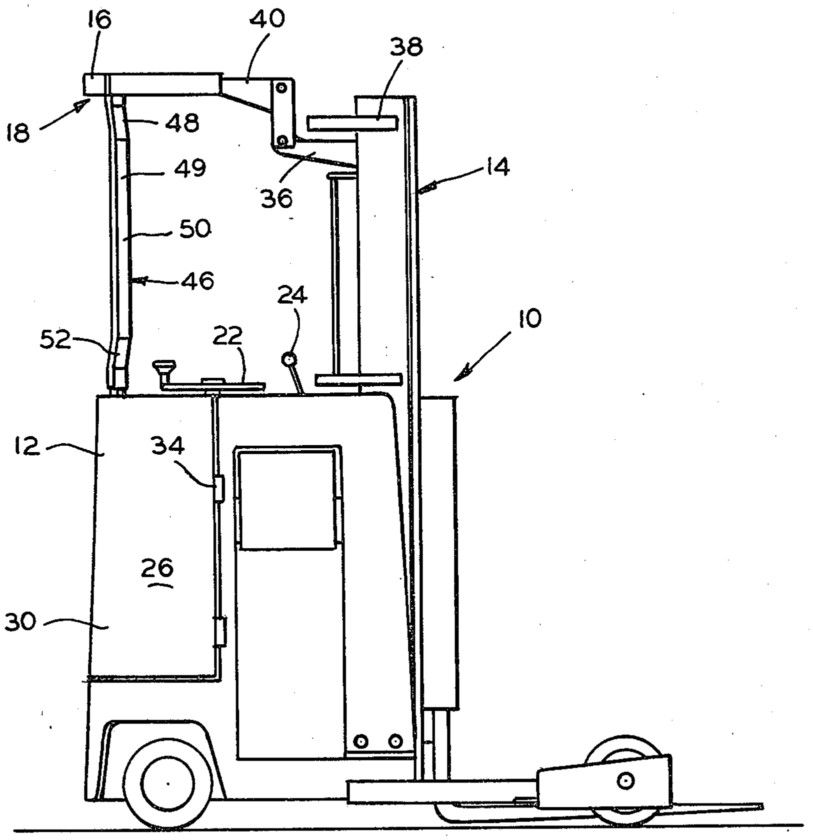
FIG. 1 is a side elevation of a narrow-aisle lift truck embodying the improvements of the present invention.

Referring now to FIG. 1, an industrial vehicle in the form of a narrow-aisle lift truck 10 includes an upright assembly 14 mounted on a lift truck body 12. An overhead canopy 16 of an overhead guard assembly 18 is mounted on the lift truck in the usual fashion.

Figure 2:
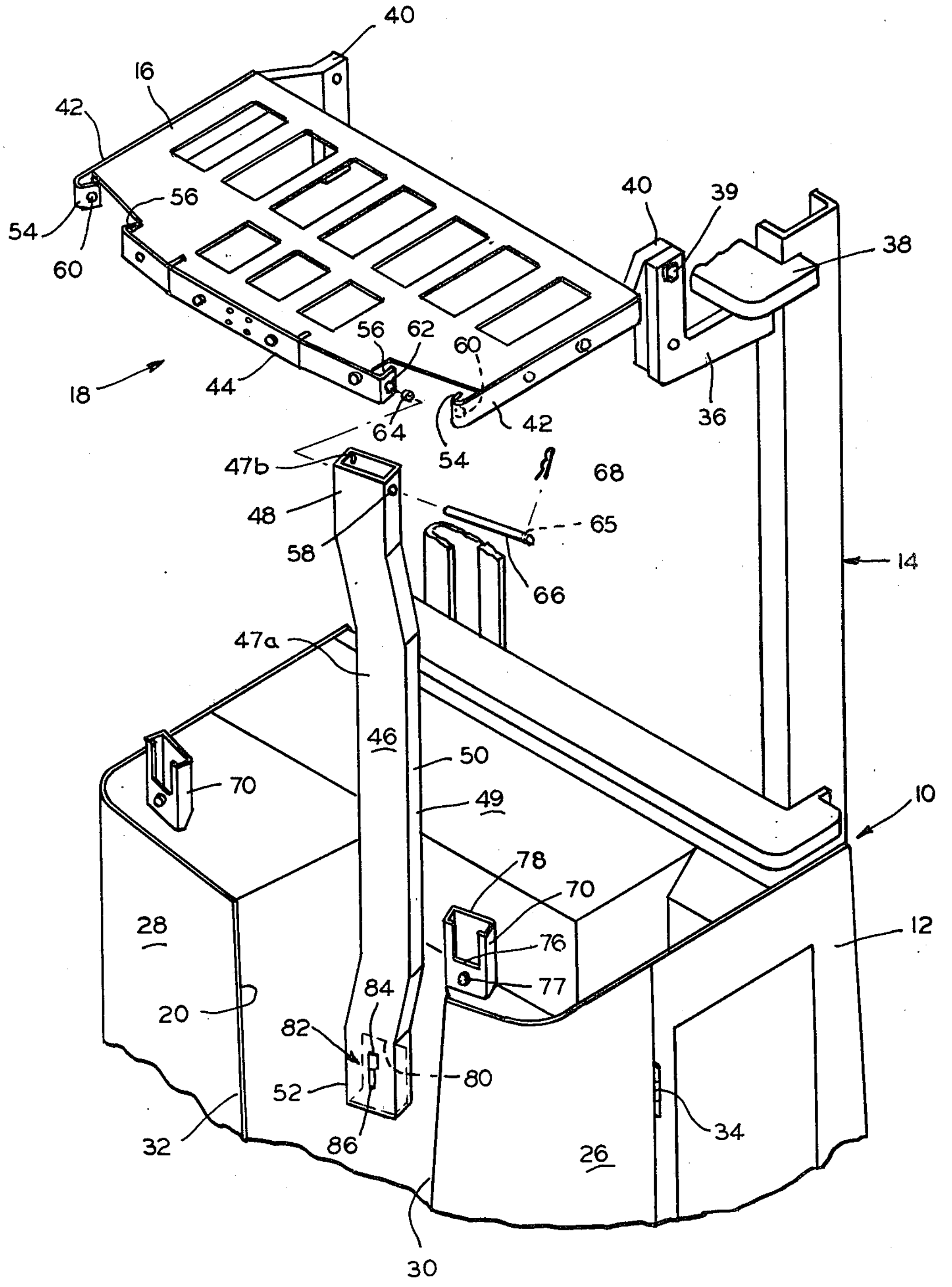
FIG. 2 is a perspective view illustrating the manner in which the overhead guard of the present invention is assembled and attached to a narrow-aisle lift truck.

As shown in FIG. 1 viewed in conjunction with FIG. 2, an operator's station 20 is provided in the truck body 12. A steering wheel 22 and hand controls 24 are capable of manipulation from the operator's station 20. A service compartment 26 is provided at the right rear end of the truck body 12. Similarly, a service compartment 28 is provided at the left rear end of the truck body 12. Each of the service compartments 26,28 includes a respective service door 30,32 connected to the sides of the lift truck body 12 by pairs of hinges 34. A latch stop 70 is fixed to and positioned above each respective service door 30,32. The service doors 30,32 may be opened to outward positions to expose the components enclosed in the respective compartments for servicing and repair.

Referring now to FIG. 2, an "L" shaped mounting bracket 36 is rigidly attached to either end of a top cross piece 38 of upright assembly 14. An adapter bracket 40 is attached to each of the mounting brackets 36 by a bolt and nut assembly 39. The two adapter brackets 40 support the overhead canopy 16. A side molding 42 is provided on either side edge of the canopy 16. Each terminal end of the respective side edge molding 42 is provided with a bent-back portion 54 having an opening 60 therein. A back molding 44 is provided at the rear edge of the canopy 16. Each of the two terminal ends of the back edge molding 44 is provided with a bent-back portion 56 having an opening 62 therein that is aligned with respective side edge molding openings 60.

A pair of vertical side posts 46 are each generally in the form of a rectangular hollow beam having relatively wide, spaced apart, opposed side walls 47*a* and 47*b* and a pair of connecting relatively narrow opposed side walls 49. Each of the vertical side posts 46 has an in-line upper end 48 and lower end 52, and an off-set middle section 50. Each of the opposed relatively narrow side walls 49 of respective side posts 46 has upper aligned openings 58 which may be placed in alignment with openings 60 and 62 in respective side molding 42 and back molding 44. A rubber grommet 64 having an internal bore at least partially therethrough is placed in each opening 62 and a rod 66 is inserted through the respective aligned openings 60, 58 and 62 until the advancing end of the rod 66 is received in the internal bore in the grommet 64. The other end of the rod has a transverse opening (illustrated in dotted lines in FIG. 2) through which a cotter pin 68 is inserted to hold the rod 66 in place so that each vertical side post 46 is pivotally mounted to the canopy 16 for rotation about the horizontal rod 66.

Each relatively wide sidewall **47*b* is provided with a cutout 80 that is configured so that the latch stop 70 may be received in the interior of hollow beam side post 46. Each side post 46 has a locked position in which the outer surface of sidewall 47*b* is flush with the outer surface of the back wall portion 78 of the latch step 70. Each of the sidewalls 47*a* at their lower ends 52 is provided with a flush type trigger-action latch member 82 that is capable of locking engagement with a latching portion 76 of latch stop 70. A rubber grommet 77 is mounted in the latch stop 70 directly below the latching portion 76. The interior of sidewall 47*a* is positioned against the rubber grommet 77 when the side post is in its locked position shown in FIG. 1**.

Figure 5:
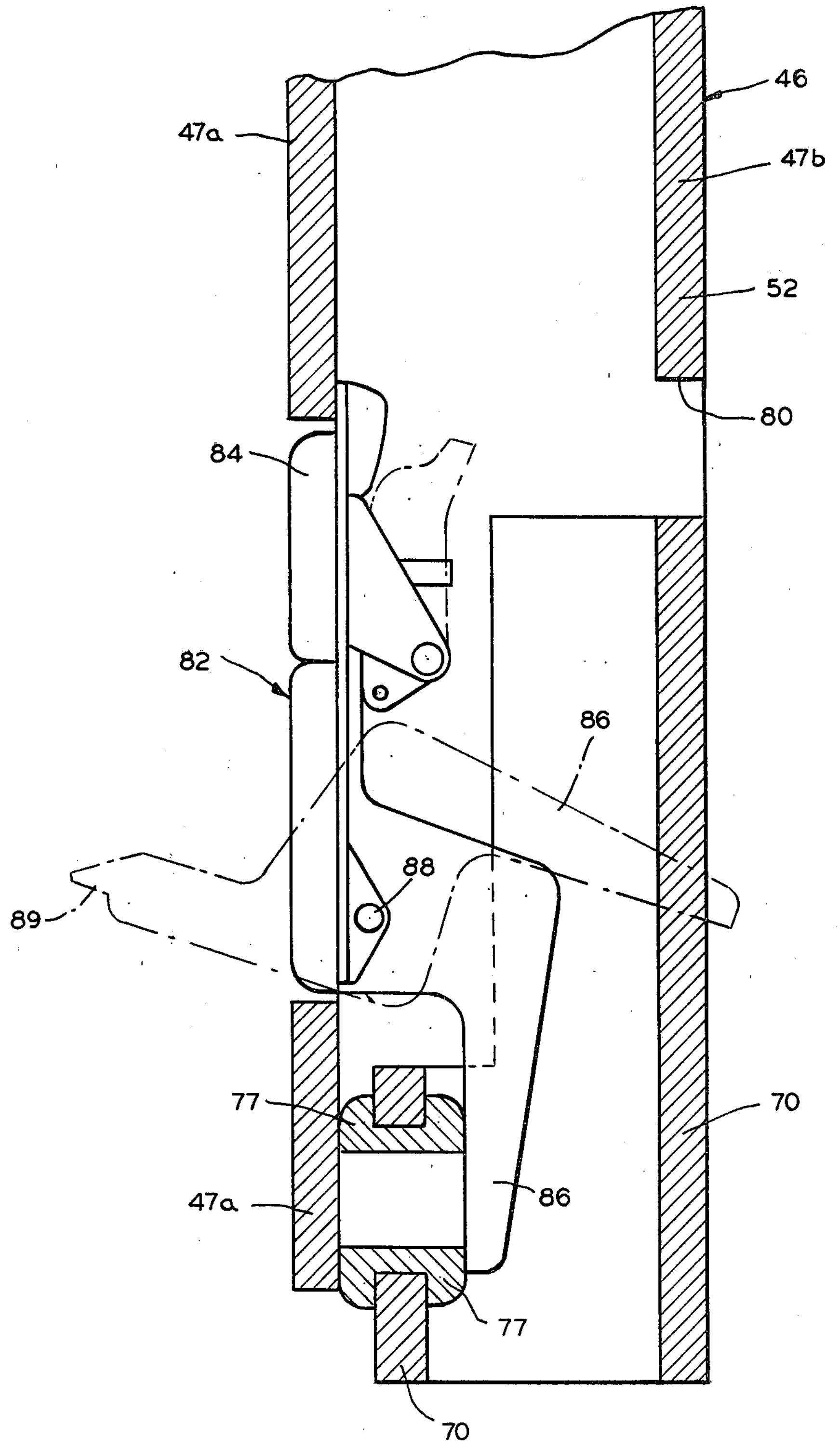
FIG. 5 is a detail view of the lower end of one of the vertical side posts shown engaged with the associated latch stop.

The latching member 82 is mounted on the lower end 52 of sidewall **47*a* and includes a trigger 84 and a bolt 86. The interlocked position of the bolt 86 is shown in solid lines in FIG. 5. In the interlocked position the upper tip portion 89 of bolt 86 is engaged with the trigger 84 to urge the side post 46 against the latch stop 70. In the dotted line unlocked position of bolt 86, the bolt has pivoted away from engagement with the trigger 84. The bolt 85 is biased towards its unlocked position shown in dotted lines in FIG. 5 under the influence of torsion spring 88. To unlock the latch member 82, trigger 84 is depressed so that the tip portion 89 of bolt 86 is released from its locked position to allow the bolt 86 to pivot to its unlocked, dotted line position. To relock the latch member 82, the bolt 86 is manually repositioned so that the tip 89 of bolt 84 is held in its locked position by the trigger 84**.

Figure 4:
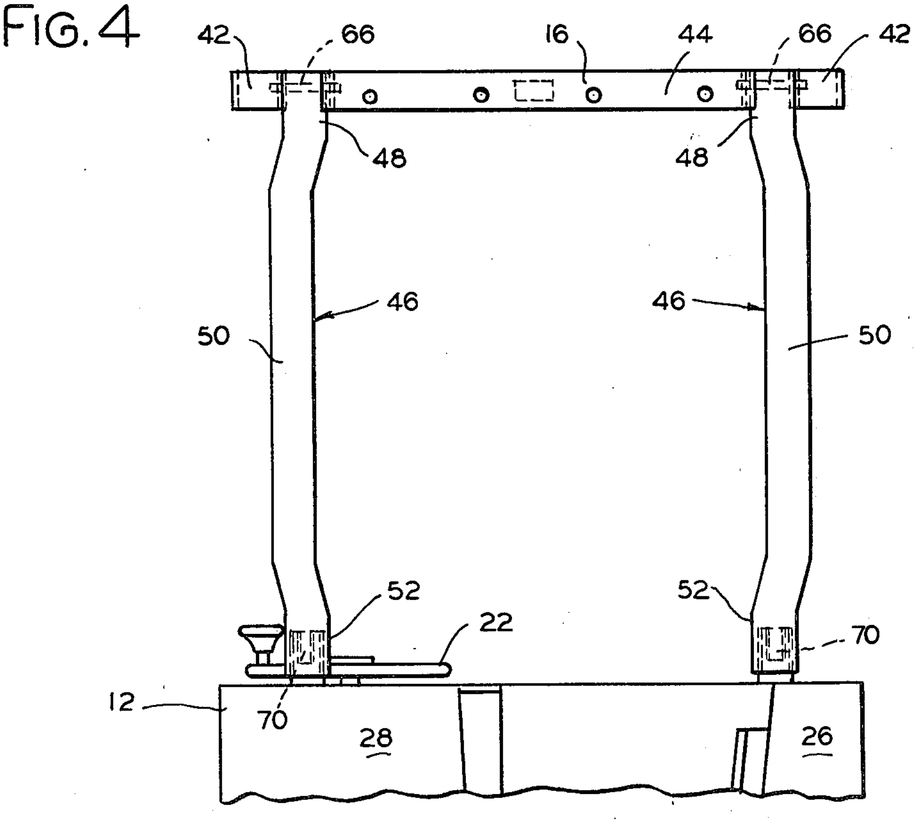
FIG. 4 is a rear elevation similar to FIG. 3 except that the vertical side posts are illustrated in their outwardly recessed positions with middle sections of the vertical posts spaced away from the operator's position.

The vertical side posts 46 illustrated in FIGS. 1, 2 and 4 are in their outwardly recessed positions to place the side posts outside of the normal line of vision of the operator. In their outwardly recessed positions the respective offset middle sections 50 of each post is spaced away from the operator's station 20.

Figure 3:
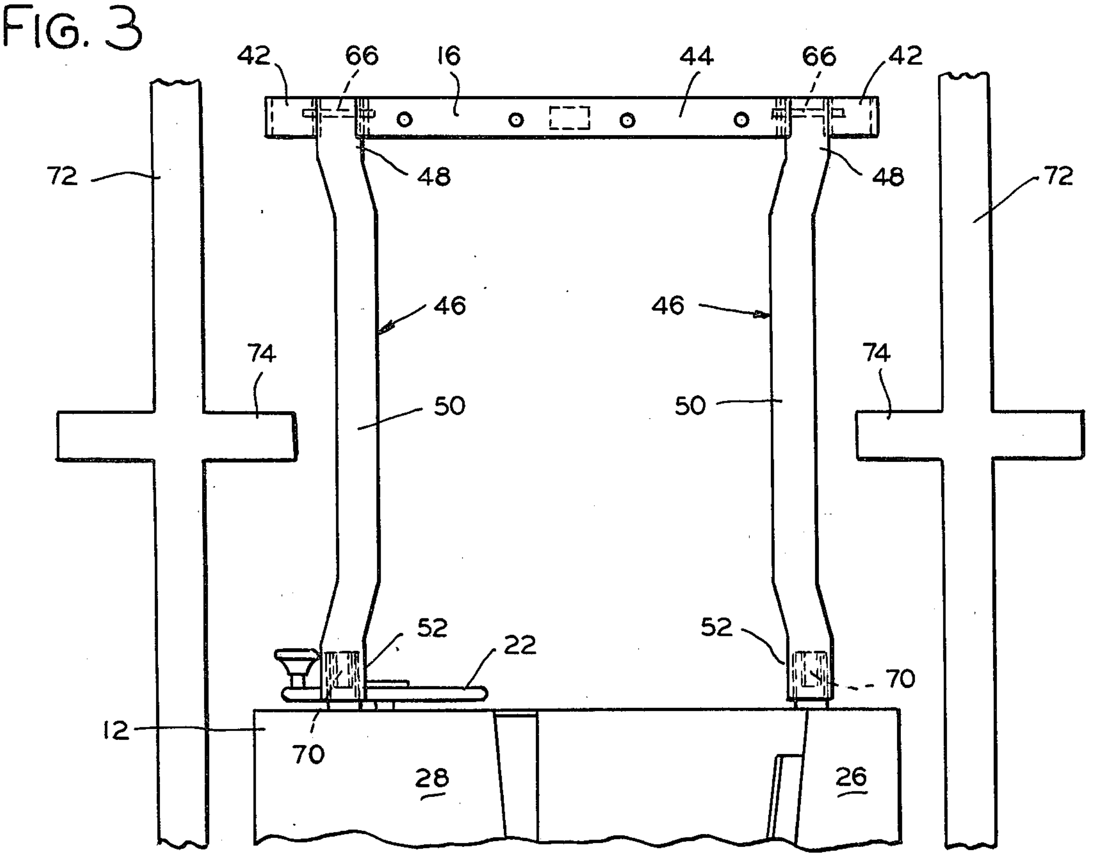
FIG. 3 is a rear elevation of a portion of the lift truck shown in FIG. 1 with the rear vertical posts of the overhead guard in their proximal positions so that the middle sections of the vertical posts are near the operator's position.

The vertical side posts 46 illustrated in FIG. 3 are in their proximal positions where the offset middle sections 50 of respective posts are spaced adjacent the operator's position 20. In the proximal position the distance between the respective middle sections 50 is less than the distance between the respective end sections 48,52 of respective posts and less than the general width of the lift truck body 12.

To change the side posts 46 from their outwardly recessed positions shown in FIGS. 1, 2 and 4 to their proximal positions shown in FIG. 3, the mounting positions of the side posts are interchanged so that the right-hand side post 46 shown in FIGS. 1, 2 and 4 is mounted in FIG. 3 in left hand position and the left post 46 shown in FIGS. 1, 2 and 4 is mounted in FIG. 3 in the right hand position. It should be noted since the lower ends 52 are in line with the upper ends 48 of each respective side post 46, the latch members do not have to be repositioned when the side posts are interchanged.

In FIG. 3, a stacking rack 72 having a load supporting member 74 is shown in either side of the lift truck 10. Each of the load supporting members 74 is fixed to a respective stacking rack 72 at parallel heights adjacent to the middle sections of the side post 46. The lift truck 10 can pass through the load supporting members in drive through operations even though the distance between the load supporting members 74 is less than the distance between respective end sections 48,52 of respective posts 46 so long as the distance between the load supporting members is greater than the distance between the middle sections 50 of respective posts 46. The side posts in their FIG. 3 proximal position provide the operator with additional protection from an injury due to inadvertent or negligent backing of the lift truck while still allowing the operator to use the lift truck in drive-through stacking racks.

From the foregoing, it is believed that those familiar with the art will readily recognize and appreciate the novel concepts and features of the present invention. Obviously, the offset side post concept for industrial vehicles is not limited to narrow-aisle lift trucks but can also be readily adapted to other types of industrial vehicles if it is desirable to minimize operator cab width.

While the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, within the scope of the invention as determined solely by reference to the claims appended hereto.

I claim:

1. An industrial vehicle having an upright structure adjacent its front end, a body portion to the rear of the upright structure, an operator's compartment on the body portion, and a protective canopy rigidly mounted cantilever fashion on the upright structure and extending rearwardly over the operator's compartment, comprising a first elongated post pivotally mounted on said canopy adjacent the distal end thereof and depending therefrom, a second elongated post pivotally mounted on said canopy adjacent the distal end thereof and depending therefrom, said second post being spaced laterally from said first post, each of said posts having an upper end, a middle section and a lower end, said middle section of each post having a lateral offset relative to said upper and lower ends thereof, the said two posts selectively mountable on said canopy so that the distance between their respective middle sections is less than the distance between their respective upper ends, and means associated with said lower ends of said posts respectively for selectively securing the posts to said body portion.

2. An industrial vehicle as claimed in claim 1 wherein the said two posts are selectively mountable on said canopy so that the distance between their respective middle sections is greater than the distance between their respective upper ends.

3. An industrial vehicle as claimed in claim 2 wherein the upper and lower ends of each post are in substantially in-line relationship.

4. An industrial vehicle as claimed in claim 3 wherein said first and second posts are allochirally related.

5. An industrial vehicle as claimed in claim 1 wherein said securing means includes a latch mechanism for each post.

6. An industrial vehicle as claimed in claim 5 wherein said latch mechanism includes a first latch member connected to its respective post and a second latch member connected to said body portion, said latch members having a locked position in which the respective post is secured to said body portion and an unlocked condition in which each post is free to pivot on its respective pivotal mounting on said canopy.

* * * * *